Figure 1:
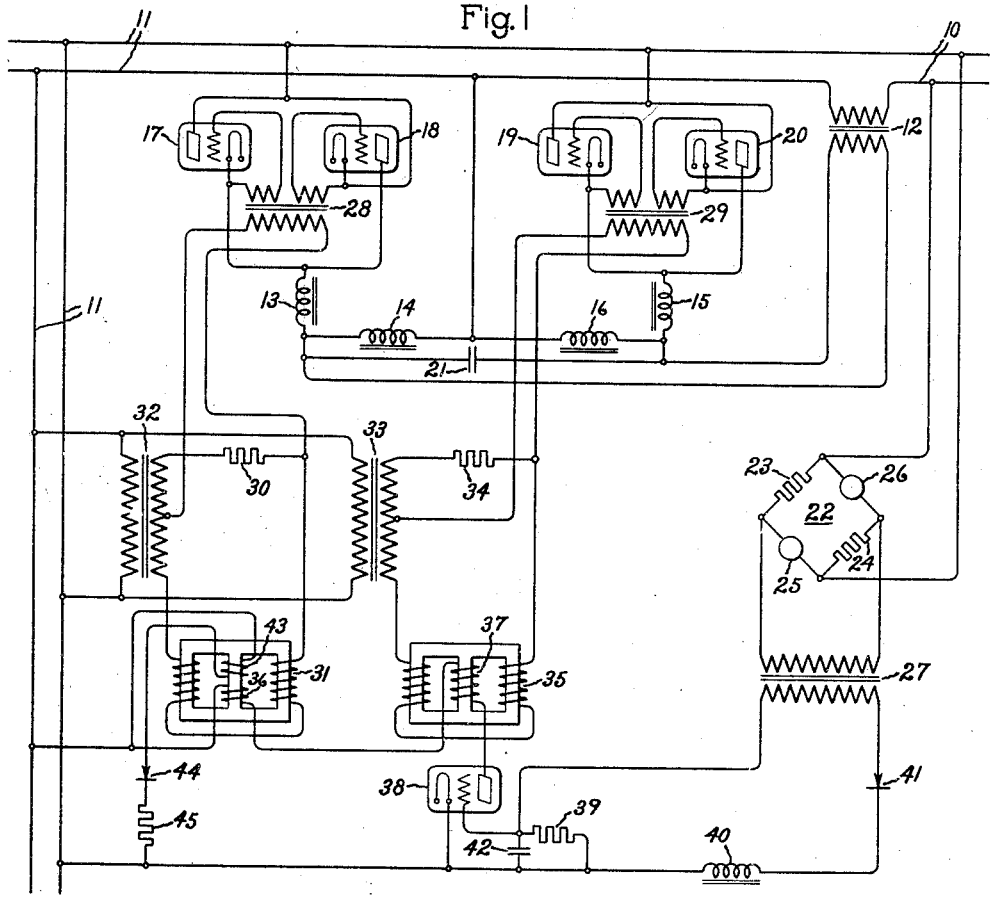

Jan. 10, 1933.  A. S. FITZ GERALD ET AL  1,893,767

ELECTRIC REGULATOR

Filed April 17, 1931

Inventors:
Alan S. FitzGerald,
Francis L. Gaines,
by Charles E. Tullar
Their Attorney.

Patented Jan. 10, 1933

1,893,767

UNITED STATES PATENT OFFICE

ALAN S. FITZ GERALD, OF WYNNEWOOD, PENNSYLVANIA, AND FRANCIS L. GAINES, OF BERKELEY, CALIFORNIA, ASSIGNORS TO GENERAL ELECTRIC COMPANY, A CORPORATION OF NEW YORK

ELECTRIC REGULATOR

Application filed April 17, 1931. Serial No. 530,888.

Our invention relates to apparatus for regulating an electrical condition of an alternating current circuit and more particularly to an electrical regulating apparatus utilizing electric valves which is particularly suitable for regulating the voltage of an alternating current feeder circuit.

Heretofore there have been devised numerous arrangements for regulating the voltage or other electrical condition of an alternating current circuit. Certain of these arrangements involve the use of contacts and other moving parts which tend to become unreliable in operation and are subject to wear and other deterioration in use. Certain other regulating apparatus have been devised utilizing electric valves for effecting the desired regulation. Examples of this latter type are disclosed and claimed in the copending applications of A. S. Fitz Gerald, filed April 17, 1931, Serial No. 530,895, H. T. Lyman, filed April 17, 1931, Serial No. 530,886, A. Boyajian, filed April 17, 1931, Serial No. 530,880, and G. W. Garman, filed April 17, 1931, Serial No. 530,881, all assigned to the same assignee as the present application. Our invention relates to the type of regulating apparatus disclosed in the above mentioned applications which broadly claim certain features of the apparatus disclosed in this application.

It is an object of our invention to provide an improved regulating apparatus, utilizing electric valves, which is simple and economical in operation and by means of which any desired fineness of regulation may be secured.

It is another object of our invention to provide an improved regulating apparatus utilizing electric valves in which any harmonic of current or voltage occasioned by the use of the electric valves will be substantially suppressed from the regulated circuit.

It is a further object of our invention to provide an improved phase shifting circuit for deriving from a source of alternating current two potentials, simultaneously and oppositely variable in phase with respect to the potential of said supply circuit, which is of general application but which is particularly suitable for use in connection with an electric regulator of the type disclosed in the above mentioned Lyman application.

In accordance with our invention we provide an alternating current circuit with a booster transformer and energize the primary winding of this transformer from an impedance bridge. Each of two adjacent arms of this impedance bridge include a pair of electric valves reversely connected in parallel and the conductivity of these valves is controlled by adjusting the phase relation between the anode potentials and the grid potentials of the valve. One diagonal of this bridge is connected across the supply circuit while the booster transformer is energized across the other diagonal. Our improved phase shifting arrangement for controlling the conductivity of these two pairs of valves comprises two impedance phase shifting circuits each including a saturable reactor. Each of the reactors is provided with a saturating winding connected across the supply circuit through an electric valve. One of the reactors is provided with a second saturating winding differentially wound with respect to the first and energized at a constant value. The conductivity of the electric valve connected in series with the saturating windings is controlled in response to variations in the voltage of the regulated circuit.

Figure 2:
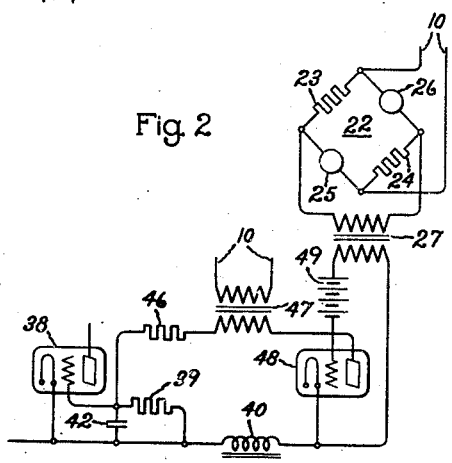
Figure 3:
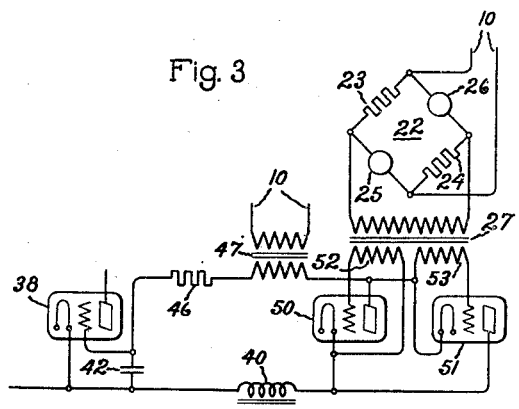

For a better understanding of our invention, together with other and further objects thereof, reference is had to the following description taken in connection with the accompanying drawing and its scope will be pointed out in the appended claims. Fig. 1 of the accompanying drawing is a diagrammatic representation of our invention as applied to an arrangement for maintaining constant the voltage of an alternating current feeder circuit, while Figs. 2 and 3 show certain modifications of the control circuit for our improved phase shifting circuit.

Referring to Fig. 1 of the drawing we have illustrated an apparatus for regulating the voltage of an alternating current load circuit 10 energized from an alternating current supply circuit 11. This apparatus comprises a booster transformer 12 provided with a secondary winding interconnecting the circuits and with a primary winding connected across one diagonal of an impedance bridge. This impedance bridge comprises two adjacent arms made up of reactors 14 and 16, respectively, and the two adjacent arms made up of a reactor 13 and a pair of electric valves 17 and 18 reversely connected in parallel, and a reactor 15 and a pair of electric valves 19 and 20 reversely connected in parallel, respectively. Electric valves 17 to 20 inclusive are each provided with an anode, a cathode and a control grid and may be of any of the several types well known in the art, although we prefer to use valves of the vapor electric discharge type in which the starting of current in the valve is determined by the potential on its control grid but in which current flowing through the valve may be interrupted only by reducing its anode potential below the critical value. A capacitor 21 is connected across the diagonal of the bridge from which the primary winding of the transformer 12 is energized.

The arrangement for controlling the potentials of the electric valves 17 to 20 inclusive comprises, in general, a voltage responsive element for indicating a departure of the voltage of the feeder circuit from normal, a phase shifting device for controlling the phase angle between the grid and anode potentials of the electric valves, and means for actuating the phase shifting circuit in one direction when the voltage is high, in the other direction when it is low, and for holding it steady when the voltage is correct. The voltage responsive element comprises a bridge 22 having a pair of opposite arms 23 and 24 which are preferably resistors having substantially zero current-resistance characteristics and a pair of opposite arms 25 and 26 which are preferably resistance devices having very high current-resistance characteristics, either positive or negative, such for example as ballast lamps, examples of which are well known in the art. One diagonal of the voltage responsive bridge is energized across the load circuit 10 while the other diagonal is connected to the primary winding of a control transformer 27.

In order to control the conductivity of the valves 17 to 20 inclusive, the grids of these valves are connected to their respective cathodes through oppositely connected secondary windings of the grid transformers 28 and 29 respectively. The primary windings of grid transformers 28 and 29 are energized from our improved phase shifting arrangement including an impedance phase shifting circuit comprising a resistor 30 and a saturable reactor 31 connected across the secondary winding of a transformer 32, the primary winding of which is connected to the supply circuit 11. It also includes a second impedance phase shifting circuit comprising a resistor 34 and a reactor 35 connected across the secondary winding of a transformer 33, the primary winding of which is also connected to the supply circuit 11. The primary windings of transformers 28 and 29 are preferably connected between the midpoints of the respective phase shifting circuits, that is between the junction of the resistors and reactors and the electrical midpoints of the secondary windings of the transformers 32 and 33 respectively. The reactors 31 and 35 are provided with saturating windings 36 and 37, respectively, which are connected in series across the supply circuit through an electric valve 38. The valve 38 is preferably of the high vacuum pure electron discharge type. The control grid of electric valve 38 is connected to its cathode through a resistor 39 which is included in the circuit of the secondary winding of the control transformer 27 in series with a reactor 40 and a unilaterally conductive device shown as a contact rectifier 41. A capacitor 42 may be connected in parallel to the resistor 39 to smooth out any ripples in the potential across it due to the flow of rectified current from the transformer 27. The reactor 31 is also provided with a second saturating winding 43 differentially wound with respect to the saturating winding 36 and energized from the supply circuit 11 through a unilaterally conductive device, shown as a contact rectifier 44, and a resistor 45.

The above described power circuit per se forms no part of our present invention but is disclosed and claimed in the copending application of H. T. Lyman, filed April 17, 1931, Ser. No. 530,886, assigned to the same assignee as the present application, to which reference is made for a detailed explanation of its operation. Briefly, the two pairs of valves 17 and 18, and 19 and 20 respectively comprise the equivalent of two impedances, the magnitude of which are determined by the phase relation between the grid and anode potentials of the valves. The valves 17 to 20 inclusive, together with the reactors 13 to 16 inclusive, constitute an impedance bridge energized from the supply circuit 11. The booster transformer 12 is energized in accordance with the unbalance voltage of the impedance bridge, which is determined by the excitation of the electric valves. The current passed by the electric valves comprises a series of chopped half sine waves containing a number of higher harmonics of current which would be objectionable if allowed to flow in the load circuit 10. It has been found that these may be substantially suppressed by connecting the capacitor 21 across the diagonal of the impedance bridge from which the transformer 12 is energized. In order to control the grid potentials of the valves 17 to 20 inclusive we have provided an improved phase shifting arrangement for deriving from a source of alternating potential, two potentials simultaneously and oppositely variable in phase with respect to that of the source. This phase shifting arrangement is controlled by a voltage responsive device energized from the load circuit so that the grid potentials of one pair of valves will be retarded with respect to their anode potentials while the grid potentials of the other pair of valves will be advanced with respect to their anode potentials in response to variations in the voltage of the load circuit. The change in the conductivities of the valves 17 to 20, inclusive, changes the excitation of the booster transformer and brings the voltage of the load circuit back to normal. This voltage responsive device is shown as a resistance bridge 22 which is normally unbalanced in such a direction as to impress a negative potential upon the grid of the valve 38 by means of the control transformer 27, the rectifier 41 and the resistor 39, the reactor 40 and capacitor 42 serving merely to smooth out the ripples of rectified current. Electric valve 38 preferably has a negative grid voltage characteristic, that is its full range of conductivity may be obtained by varying its grid potential within predetermined limits of negative potential. The winding 43 of reactor 31 is differentially wound with respect to the winding 36 and is of an equal number of turns. The resistance of resistor 45 is equal to that of the valve 38 in its condition of maximum conductivity so that, under this condition, the core of reactor 31 is completely unsaturated, while at the same time the core of the reactor 35 is completely saturated. Assume now that the voltage of the load circuit 10 is normal and that the unbalance of the bridge 22 is just sufficient to maintain the proper phase relation between the grid potentials and the anode potentials of the valves 17 to 20 inclusive so that the proper amount of buck or boost is applied to the transformer 12 for existing load conditions of the circuit 10. If now the voltage of the circuit 10 tends to drop, due to an increase in load or for any other cause, the voltage responsive bridge will become more unbalanced so that a larger current will flow through resistor 39 from the control transformer 27 and a higher negative potential will be impressed upon the grid of valve 38. This will result directly in a decrease in the saturation of the core of reactor 35, a decrease in the current flowing in the saturating winding 36, and a resulting increase in the saturation of the core of reactor 31, due to the differential winding 43. A decrease in the saturation of reactor 35 will increase its impedance with the result that the phase of the potentials supplied from the phase shifting circuit comprising resistor 34 and reactor 35 to the grids of electric valves 19 and 20 will be retarded with respect to the anode potentials of these valves and their impedance will be increased. At the same time, as the saturation of the core of reactor 31 is increased, its impedance will be decreased and the phase of potentials supplied to the grid of the valves 17 and 18 will be advanced with respect to their anode potential and the effective impedance of these valves will be decreased. The impedance bridge is now unbalanced in such a direction as to energize the primary winding of booster transformer 12 to bring the voltage of the load circuit 10 back to normal. Obviously, with an increase in the voltage of load circuit above normal, the reverse operation will take place.

The above described voltage control arrangement is of the so-called engine governor type in which the voltage is not maintained exactly constant at some fixed value, but in which it is allowed to vary within narrow predetermined limits in accordance with variations in the load on the circuit. In some cases however it may be desirable to maintain the average value of the voltage of the load circuit 10 constant at some fixed value. This may be accomplished by the voltage control circuit illustrated in Fig. 2, which is of the dynamic type, that is one in which the voltage of the load circuit is rapidly varied between two fixed voltages above and below the normal voltage, respectively, the relative intervals during which the voltage is maintained at its upper value or its lower value determining the average voltage of the circuit. The power circuit and the phase shifting circuit for controlling the grids of the valves 15 to 20 inclusive may be the same as that illustrated in Fig. 1, but in this case the voltage responsive bridge 22 is balanced when the voltage of the circuit 10 is normal so that the unbalance voltage reverses polarity when the voltage of the load circuit passes through the normal value. In this arrangement the grid of the electric valve 38 is excited by the potential across a capacitor 42 which is charged through a circuit including a current limiting resistor 46, the secondary winding of a transformer 47, the primary winding of which is energized from the circuit 10, an electric valve 48 and a reactor 40. As in the arrangement described above, the resistor 39 is connected in parallel to the capacitor 42. Electric valve 48 is preferably of the three-electrode vapor electric discharge type, and is provided with a grid circuit energized with the unbalance voltage of the bridge 22 through a control transformer 27 and a negative bias battery 49. With this voltage control circuit the connections of the booster transformer 12 are reversed so that an increase in the negative grid potential of electric valve 38 lowers the voltage of the load circuit 10 instead of raising it as in the arrangement illustrated in Fig. 1. Assume for example that when the voltage of the circuit 10 is above normal, the unbalance voltage of the bridge 22 is of such a polarity that the grid and anode potentials of electric valve 48 are in phase and that the capacitor 42 is charged through this valve in such a direction that the potential of its upper terminal increases negatively. The voltage of the load circuit 10 will now be lowered as described above and as it passes through normal, the polarity of the potential applied to the grid of electric valve 48 will reverse so that this valve will become non-conducting. The capacitor 42 will now slowly discharge through resistor 39 so that the grid of the valve 38 will become more positive and the voltage of the load circuit 10 will be correspondingly raised. When the voltage of the circuit 10 rises above normal the grid polarity of the electric valve 48 will be reversed again and the above described cycle will be repeated indefinitely. The constants of the capacitor 42 and its charging circuit may be so chosen that the voltage of the load circuit will vary within narrowly prescribed limits and with such rapidity that there will be no appreciable flicker in the voltage of the load circuit 10. The average voltage of the load circuit 10 will of course depend upon the relative duration of the intervals when it is above normal voltage and when it is below normal voltage.

In Fig. 3 there is illustrated a voltage control circuit of the so-called position type in which in case the voltage of the load circuit 10 deviates from normal, it will always be brought back to the exact value for which the regulator is set. In this arrangement the charging circuit of capacitor 42 includes two vapor electric valves 50 and 51 reversely connected in parallel so that the capacitor may be charged to either polarity by means of the transformer 47 energized from the load circuit 10. In this case the discharge resistor of the capacitor 42 is omitted. The control transformer 27 is provided with two secondary windings 52 and 53 which are adapted to excite the grids of the valves 50 and 51 with the same polarity, while it is seen that the anode potentials of these valves are of an opposite polarity. The operation of the apparatus just described is similar to that illustrated in Fig. 2 with the exception that both the charging and discharging of capacitor 42 are controlled by the valves 50 and 51 so that when neither of these valves is conductive the charge on capacitor 42 will be maintained constant, as will be the energization of the boosting transformer 12, so that the voltage of the load circuit 10 remains at normal.

While we have described what we at present consider the preferred embodiment of our invention, it will be obvious to those skilled in the art that various changes and modifications may be made without departing from our invention, and we therefore aim in the appended claims to cover all such changes and modifications as fall within the true spirit and scope of our invention.

What we claim as new and desire to secure by Letters Patent of the United States, is:

1. In a regulating system, the combination of a regulated circuit, means including a pair of electric valves for controlling an electrical condition of said circuit, and means responsive to an electrical condition of said circuit for regulating the conductivities of said pair of valves in an opposite sense.

2. In combination, an alternating current supply circuit, a load circuit, interconnecting means for determining the relative potentials of said circuits including a pair of electric valves, and means responsive to an electrical condition of said load circuit for regulating the conductivities of said valves in an opposite sense.

3. In combination, an alternating current supply circuit, a load circuit, interconnecting means for determining the relative potentials of said circuits including an impedance bridge, an electric valve in each of two arms of said bridge, and means responsive to an electrical condition of said load circuit for regulating the conductivities of said valves in an opposite sense.

4. In combination, an alternating current supply circuit, a load circuit, an impedance bridge, an electric valve in each of two arms of said bridge, one diagonal of said bridge being energized from one of said circuits, a booster transformer provided with a secondary winding interconnecting said circuits and with a primary winding energized across the other diagonal of said bridge, and means responsive to an electrical condition of said load circuit for regulating the conductivities of said valves in an opposite sense.

5. In combination, an alternating current supply circuit, a load circuit, an impedance bridge, each of two adjacent arms of which include a pair of electric valves reversely connected in parallel, one diagonal of said bridge being energized from said supply circuit, a booster transformer provided with a secondary winding interconnecting said circuits and with a primary winding energized across the other diagonal of said bridge, and means responsive to an electrical condition of said load circuit for regulating the conductivities of said valves in an opposite sense.

6. In combination, an alternating current supply circuit, a load circuit, interconnecting means for determining the relative potentials of said circuits including a pair of electric valves, each provided with an anode, a cathode, and a control grid, and means responsive to an electrical condition of said load circuit for regulating the phase angles between the grid and anode potentials of said valves in an opposite sense.

7. In combination, an alternating current supply circuit, a load circuit, interconnecting means for determining the relative potentials of said circuits including a pair of electric valves, each provided with an anode, a cathode, and a control grid, an impedance phase shifting circuit associated with each valve for controlling the grid potential thereof, and means responsive to an electrical condition of said load circuit for regulating said phase shifting circuits in an opposite sense.

8. In combination, an alternating current supply circuit, a load circuit, interconnecting means for determining the relative potentials of said circuits including a pair of electric valves, each provided with an anode, a cathode, and a control grid, an impedance phase shifting circuit associated with each valve for controlling the grid potential thereof, means including an electric valve for regulating said phase shifting circuits in an opposite sense, and means responsive to an electrical condition of said load circuit for controlling the conductivity of said last mentioned valve.

9. In a regulating system, the combination of a regulated circuit, means including a pair of electric valves for controlling an electrical condition of said circuit, means including a third electric valve for varying the conductivities of said pair of valves in an opposite sense, and means responsive to an electrical condition of said regulated circuit for controlling the conductivity of said third valve.

10. In a regulating system, the combination of a regulated circuit, means including a pair of electric valves for controlling an electrical condition of said circuit, means including a third electric valve for varying the conductivities of said pair of valves in an opposite sense, a bridge circuit energized from said regulated circuit, and means for controlling the conductivity of said third valve in accordance with the unbalance voltage of said bridge.

11. In combination, an alternating current supply circuit, and means for deriving from said circuit two potentials simultaneously and oppositely variable in phase with respect to said supply potential comprising a pair of impedance phase shifting circuits energized from said supply circuit each including a reactor provided with a saturating winding, a circuit for variably and equally energizing said windings, and means for constantly saturating one of said reactors with an opposite magnetic polarity.

12. In combination, a source of alternating current and means for deriving from said circuit two potentials simultaneously and oppositely variable in phase with respect to the potential of said source comprising a pair of impedance phase shifting circuits energized from said source each including a reactor provided with a saturating winding, a circuit for variably and equally energizing said windings, a second saturating winding differentially wound on one of said reactors, and a circuit for energizing said differential winding at a constant value.

13. In combination, a source of alternating current, and means for deriving from said source two potentials simultaneously and oppositely variable in phase with respect to the potential of said source comprising a pair of impedance phase shifting circuits energized from said source, each including a resistor and a reactor provided with a saturating winding, and an electric valve, said windings being serially connected across said source through said electric valve, a unilaterally conductive device, a second saturating winding differentially wound on one of said reactors and connected across said source through said unilaterally conductive device, and means for varying the conductivity of said electric valve.

In witness whereof we have hereunto set our hands.

ALAN S. FITZ GERALD.
FRANCIS L. GAINES.